(12) United States Patent
Nagao

(10) Patent No.: US 10,008,200 B2
(45) Date of Patent: Jun. 26, 2018

(54) DECODER FOR SEARCHING A PATH ACCORDING TO A SIGNAL SEQUENCE, DECODING METHOD, AND COMPUTER PROGRAM PRODUCT

(71) Applicant: KABUSHIKI KAISHA TOSHIBA, Minato-ku, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 73 days.

(21) Appl. No.: 14/574,895

(22) Filed: Dec. 18, 2014

(65) Prior Publication Data

US 2015/0179177 A1 Jun. 25, 2015

(30) Foreign Application Priority Data

Dec. 24, 2013 (JP) .................... 2013-265948

(51) Int. Cl.
G10L 19/00 (2013.01)
G10L 15/08 (2006.01)
G10L 15/14 (2006.01)

(52) U.S. Cl.
CPC .......... *G10L 15/083* (2013.01); *G10L 15/142* (2013.01); *G10L 2015/081* (2013.01)

(58) Field of Classification Search
None
See application file for complete search history.

(56) References Cited

U.S. PATENT DOCUMENTS

| 5,168,533 | A | 12/1992 | Kato et al. |
| 6,282,541 | B1* | 8/2001 | Hoa ................. G06F 17/30489 |
| 7,711,561 | B2 | 5/2010 | Hogenhout et al. |
| 7,895,040 | B2 | 2/2011 | Sakai et al. |
| 8,275,730 | B2 | 9/2012 | Nagao |

(Continued)

FOREIGN PATENT DOCUMENTS

| JP | 03-080366 | 4/1991 |
| JP | 03-95672 | 4/1991 |

(Continued)

OTHER PUBLICATIONS

M. Mohri, et al. "Integrated context-dependent networks in very large vocabulary speech recognition," Sixth European Conference on Speech Communication and Technology (EUROSPEECH '99), pp. 811-814, 1999.

(Continued)

*Primary Examiner* — Qian Yang
(74) *Attorney, Agent, or Firm* — Amin, Turocy & Watson LLP

(57) ABSTRACT

According to an embodiment, a decoder searches a finite state transducer and outputs an output symbol string corresponding to a signal that is input or corresponding to a feature sequence of signal that is input. The decoder includes a token operating unit and a duplication eliminator. The token operating unit is configured to, every time the signal or the feature is input, propagate each of a plurality of tokens, which is assigned with a state of the head of a path being searched, according to the finite state transducer. The duplication eliminator is configured to eliminate duplication of two or more tokens which have same state assigned thereto and for which respective previously-passed transitions are assigned with same input symbol.

17 Claims, 9 Drawing Sheets

(56) References Cited

U.S. PATENT DOCUMENTS

| | | | |
|---|---|---|---|
| 8,311,825 | B2 | 11/2012 | Chen |
| 8,484,154 | B2 | 7/2013 | You et al. |
| 8,744,836 | B2 | 6/2014 | Nagao |
| 2007/0038450 | A1* | 2/2007 | Josifovski ......... G06F 17/30265 704/255 |
| 2012/0054135 | A1* | 3/2012 | Salaka ................ G06Q 10/107 706/13 |
| 2013/0073503 | A1 | 3/2013 | Nagao |
| 2013/0073564 | A1 | 3/2013 | Nagao |
| 2013/0179158 | A1 | 7/2013 | Nakamura et al. |

FOREIGN PATENT DOCUMENTS

| | | |
|---|---|---|
| JP | 03-174652 | 7/1991 |
| JP | 10-198392 | 7/1998 |
| JP | 2005-070330 | 3/2005 |
| JP | 2005-257910 | 9/2005 |
| JP | 2009-058989 | 3/2009 |
| JP | 4241771 | 3/2009 |
| JP | 4322815 | 9/2009 |
| JP | 2011-198126 | 10/2011 |
| JP | 4956334 | 6/2012 |
| JP | 4977163 | 7/2012 |
| JP | 5121650 | 1/2013 |
| JP | 2013-065188 | 4/2013 |
| JP | 2013-164572 | 8/2013 |

OTHER PUBLICATIONS

S. J. Young, et al. "Token passing: A simple conceptual model for connected speech recognition systems," Cambridge University Engineering Department, Jul. 31, 1989, 23 pages.

S. Phillips, et al. "Parallel speech recognition," International Journal of Parallel Programming, vol. 27, No. 4, 1999, Plenum Publishing Corporation, pp. 257-288.

M. Mohri. "Chapter 6: Weighted Automata Algorithms", Handbook of Weighted Automata, Monographs in Theoretical Computer Science, an EATCS Series, ISBN 978-3-642-01491-8, pp. 213-254, 2009.

T. Hori, et al. "Speech recognition algorithms using weighted finite-state transducers," A publication in the Morgan & Claypool Publishers Series, pp. 70-73, ISBN 978-1-60845-473-0, 2013.

D. Povey, et al. "Generating exact lattices in the WFST framework," in Proceedings of the International Conference on Acoustics, Speech, and Signal Processing (ICASSP'12), pp. 4213-4216, 2012.

Y. Guo, et al. "Lattice generation with accurate word boundary in WFST framework," 5th International Congress on Image and Signal Processing (CISP), 2012, pp. 1592-1595.

P. R. Dixon, et al. "The titech large vocabulary WFST speech recognition system," in Proceedings of the IEEE Workshop on Automatic Speech Recognition and Understanding (ASRU 2007), pp. 443-448, 2007.

E. Stoimenov, et al. "A multiplatform speech recognition decoder based on weighted finite-state transducers," in Proceedings of the IEEE Workshop on Automatic Speech Recognition and Understanding (ASRU 2009), pp. 293-298, 2009.

K. You, et al. "Parallel scalability in speech recognition," IEEE Signal Processing Magazine, Nov. 2009, pp. 124-135, vol. 26, Issue 6.

J. Chong, et al. "Scalable HMM based inference engine in large vocabulary continuous speech recognition," IEEE International Conference on Multimedia and Expo (ICME), 2009, pp. 1797-1800.

Saon, et al. "Anatomy of an extremely fast LVCSR decoder", Proc. of Interspeech 2005, Sep. 4, 2005, pp. 549-552.

\* cited by examiner

FIG. 9

1   $T \leftarrow \{(q, \varepsilon, 0, \varepsilon) | q \in I\}$
2   while there is a next feature vector
3     $v \leftarrow$ get feature vector
4     $T_p \leftarrow T, T \leftarrow \{t \in T \mid \text{input}(t) \neq \varepsilon\}$
5     foreach $t \in T_p$
6       foreach $e \in \text{outgoing}(\text{state}(t))$
7         $t_{\text{new}} \leftarrow (\text{n}(e), \text{input}(e), \text{score}(t) + \text{w}(e), \text{word}(t) \cdot \text{output}(e))$
8         $T \leftarrow T \cup \{t_{\text{new}}\}$
9     $T \leftarrow \bigcup_{(q,i,\cdot,\cdot) \in T} \left\{ \arg\max_{(q,i,w,x) \in T} w \right\}$
10   foreach $t \in T$
11     $\text{score}(t) \leftarrow \text{score}(t) + \text{am\_score}(v, \text{input}(t))$
12   $w_{\max} \leftarrow \max_{(\cdot,\cdot,w,\cdot) \in T} w$
13   $T \leftarrow \{t \in T \mid \text{score}(t) > w_{\max} - w_{\text{beam}}\}$
14  return word $\left( \arg\max_{t \in T \land \text{state}(t) \in F} \text{score}(t) \right)$

FIG. 10

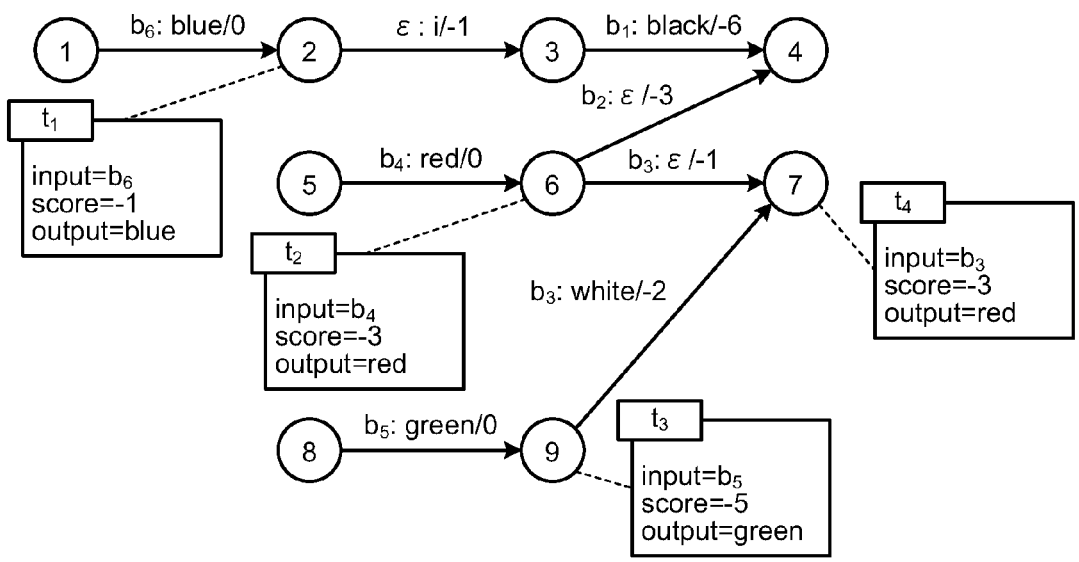

FIG.14

9    $Y \leftarrow \bigcup_{(\cdot,i,\cdot,\cdot) \in T} \left\{ \left( i, \bigcup_{(q,i,\cdot,\cdot) \in T} \left\{ \underset{(q,i,w,x) \in T}{\arg\max}\ w \right\} \right) \right\}$ 10   $T \leftarrow \{\}$
11   foreach $(i, T_i) \in Y$
12       $s \leftarrow \text{am\_score}(v, \text{input}(t))$
13       foreach $t \in T_i$
14           $\text{score}(t) \leftarrow \text{score}(t) + s$
15       $T \leftarrow T \cup T_i$

US 10,008,200 B2

DECODER FOR SEARCHING A PATH ACCORDING TO A SIGNAL SEQUENCE, DECODING METHOD, AND COMPUTER PROGRAM PRODUCT

CROSS-REFERENCE TO RELATED APPLICATION

This application is based upon and claims the benefit of priority from Japanese Patent Application No. 2013-265948, filed on Dec. 24, 2013; the entire contents of which are incorporated herein by reference.

FIELD

Embodiments described herein relate generally to a decoder, a decoding method, and a computer program product.

BACKGROUND

It is a known technology in which the pattern of input signals is recognized and the signal sequence that has been input is converted into a corresponding symbol string. For example, there are known technologies such as the technology for recognizing speech signals; the optical character recognition (OCR) technology in which characters are recognized from an image in which the characters are written; the technology for recognizing handwritten characters; and the technology for recognizing a gesture or sign language from an image. As a device for implementing such technologies, a decoder is known that searches a digraph which is formed by adding output symbols to a weighted finite state automaton (i.e., searches a weighted finite state transducer (WFST)).

In the case of performing speech recognition using a WFST-searching decoder, the hidden Markov model (HMM) needs to be modified to be available for use in such a decoder. For example, in order to make the HMM available for use in a WFST-searching decoder, input symbols of a WFST are assigned with an acoustic score function identifier that identifies a function for calculating an acoustic score.

However, if the input symbols are assigned with a score function identifier, in order to correctly deal with the self-transitions of the HMM, it is also necessary to set a limitation on the WFST that transitions assigned with only one type of input symbols are incoming to or outgoing from a single state. For that reason, the WFST to be searched using such a decoder has a large number of states and a large number of transitions, which leads to the need of having a large memory capacity.

BRIEF DESCRIPTION OF THE DRAWINGS

FIG. 9 is a diagram illustrating a pseudo code for the processes performed in the decoder according to the first embodiment;

FIG. 10 is a diagram illustrating an example of pre-propagating tokens included in a set $T_p$;

FIG. 14 is a diagram illustrating a pseudo code for the processes performed in the decoder according to the second embodiment.

DETAILED DESCRIPTION

Figure 1:
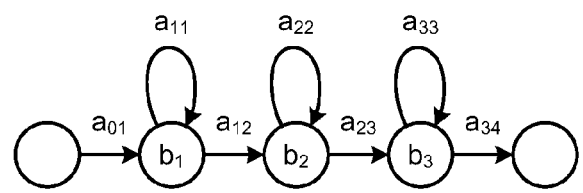
FIG. 1 is a diagram illustrating a hidden Markov model (HMM) with respect to a particular phoneme.

According to an embodiment, a decoder searches a finite state transducer and outputs an output symbol string corresponding to a signal that is input or corresponding to a feature sequence of signal that is input. The decoder includes a token operating unit and a duplication eliminator. The token operating unit is configured to, every time the signal or the feature is input, propagate each of a plurality of tokens, which is assigned with a state the head of a path being searched, according to the finite state transducer. The duplication eliminator is configured to eliminate duplication of two or more tokens which have same state assigned thereto and for which respective previously-passed transitions are assigned with same input symbol.

Premise

Firstly, the explanation is given about the technology and the definitions serving as the premise of embodiments.

WFST

In the embodiments, a search is performed in a weighted finite state transducer (WFST) that is an example of a digraph. Meanwhile, in the embodiments, although the explanation is given for an example in which a WFST is used as a digraph, it is also possible to search a non-weighted finite state transducer (i.e., a digraph identical to a WFST having the weights equal to zero).

In a WFST, a transition has an input symbol, an output symbol, and a weight assigned thereto. A WFST is configured as a 9-tuple $(Q, E, \Sigma, \Gamma, K, I, F, \lambda, \rho)$ including a set Q of states, a set E of transitions, a set $\Sigma$ of input symbols, a set $\Gamma$ of output symbols, a set K of weights, a set I of initial states, a set F of final states, an initial weight function $\lambda$, and a final weight function $\rho$. Moreover, a transition is configured as a 5-tuple (previous state, next state, input symbol, output symbol, weight).

Examples of the set K of weights include a set of all integers, a set of all real numbers, a set of all complex numbers, a matrix, and a set of Booleans (0 and 1). Besides, the set K of weights can be a set of non-positive real numbers or a set of non-negative real numbers. Meanwhile, corresponding to an initial state $q_i \in I$, the initial weight is expressed as $\lambda(q_i)$. Similarly, corresponding to a final state $q_f \in F$, the final weight is expressed as $\rho(q_f)$. The set $\Sigma$ of input symbols and the set $\Gamma$ of output symbols may include an empty symbol $\epsilon$ too.

Acoustic Model and Signal Score

For example, consider a case in which speech recognition is performed in a continuous manner using a WFST. In this case, prior to performing a recognition process, firstly, the following is prepared: an acoustic model for the purpose of converting the feature of an input speech signal into small units (such as phonemes) representing speech; a lexicon for the purpose of converting small units (such as phonemes) representing speech into words; and a language model for the purpose of constraining the sequence of words. Then, each of those models is converted into a WFST; and the models represented as WFSTs are combined. Herein, the models can be combined into a single model. Alternatively, some portion of the models may not be combined, and the noncombined portion may be combined in a dynamic manner during speech recognition.

Herein, the acoustic model is a model for the purpose of calculating a score (an acoustic score or an output probability) that indicates the degree of similarity between an input speech signal and a particular phoneme or a part of a particular phoneme. In the case of performing character recognition or gesture recognition too, such a model is used in an identical manner so as to calculate a score representing the degree of similarity; and then pattern recognition is performed. In the embodiments, including the case of performing speech recognition, the value calculated using such a model, that is, the value indicating the degree of similarity between an input signal and an output symbol is called a signal score.

HMM

FIG. 1 is a diagram illustrating a hidden Markov model with respect to a particular phoneme. While performing speech recognition, it is often the case that a hidden Markov model (HMM) is used as an acoustic model. As an example of converting an HMM into a WFST, the input symbols of the WFST are assigned with score identifiers that are used in identifying an algorithm (including a function, a computer program, a table, or an array) for calculating the signal scores, or in identifying data (including parameters), or in identifying an algorithm as well as data.

A score identifier is associated to each state of the HMM (states $b_1$, $b_2$, and $b_3$ illustrated in FIG. 1). If a state of the HMM can be identified, then it is possible to identify the corresponding score identifier. Also, there are times when the same score identifier is assigned to different states of the HMM. For example, there are times when $b_1 = b_2$ holds true. Moreover, with reference to FIG. 1, $a_{01}$, $a_{12}$, and so on represent state transition scores (also called state transition probabilities).

In order to calculate the signal scores from the acoustic model, not only the score identifiers are required, but also the input signal sequence or the feature of the input signals is required. There are times when the feature is made of a plurality of values. In such a case, the group of a plurality of features is called a feature vector. In the embodiments, including the case in which the feature is made of a plurality of values, the term feature is used.

In the embodiments, as the algorithm or the data for calculating the signal scores, a score function is used. The score function takes a signal or the feature of a signal and a score identifier as arguments, and outputs a signal score. In the case of performing speech recognition, the score function is called, for example, an acoustic score function. Moreover, the score identifier used in identifying an acoustic score function is called an acoustic score function identifier. Also, there are times when the acoustic score function identifier is called a probability distribution function identifier.

Regarding the method by which the score function calculates the signal scores, it is possible to implement any arbitrary method. For example, in the case of performing speech recognition, the method of calculating the signal scores varies depending on the type of the applied HMM. For a discrete HMM, based on a code vector corresponding to the feature and the score identifiers, the score function obtains the signal scores recorded in the form of a table or an array. For a continuous HMM, based on a plurality of parameters used in expressing the Gaussian distribution obtained from the score identifiers and based on the feature, the score function calculates the signal scores. Alternatively, the score function can calculate the signal scores using other methods such as using a neural network.

Search

Figure 2:
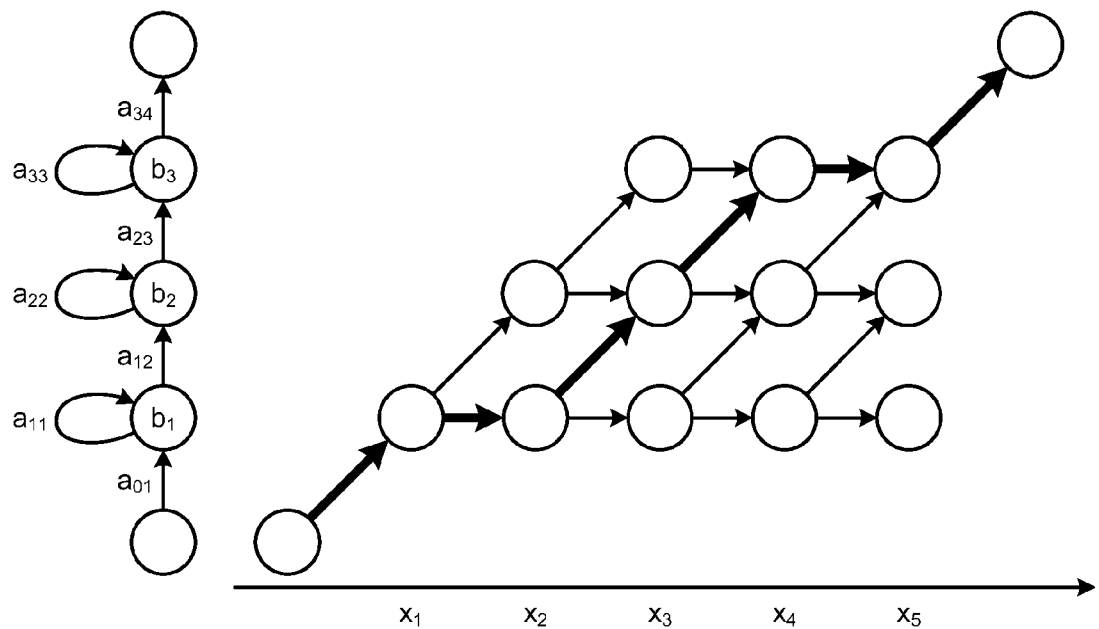
FIG. 2 is a diagram illustrating transitions of an HMM in the case in which the feature is input five times.

In FIG. 2 is illustrated an exemplary directed acyclic graph of the transitions of a hidden Markov model in the case in which the feature is input five times.

The process of searching a WFST implies calculating such a series (a path) consisting of states and transitions for which the value obtained by accumulating the signal scores and the weights according to the input signal sequence or the feature sequence of signals is the best value. This accumulated value is called an accumulation score. In the case in which the WFST has a language model combined therewith, the score obtained from the language model is also included in the accumulation score.

The path having the best accumulation score is generally found using the Viterbi algorithm. With reference to FIG. 2, an example of the best path is illustrated using heavy lines. In the example illustrated in FIG. 2, the accumulation score becomes equal to $a_{01}+s(x_1, b_1)+a_{11}+s(x_2, b_1)+a_{12}+s(x_3, b_2)+a_{23}+s(x_4, b_3)+a_{33}+s(x_5, b_3)+a_{34}$. Herein, $x_1$ to $x_5$ represent the feature input at each timing. Moreover, $s(x_n, b)$ represents the score function, where $x_n$ represents the feature that is input at the n-th instance and b represents a score identifier. Consider a case in which the accumulation score is in the form of the distance, and assume that it is better to have a smaller distance. In that case, the process of finding out the path having the best accumulation score is identical to the process of searching for the shortest path of a directed acyclic graph in which, every time a speech signal is input, one or more state and one or more transition are added.

Token Passing

In the process of searching for a path in a WFST that is converted from an HMM, a technology called token passing is often used. In this technology, an object called a token is used. To the token is assigned the state of the head of the path being searched. In the process of searching a WFST, since a plurality of paths is searched in parallel, a plurality of tokens is managed at the same time. Moreover, a token holds the accumulation score of the path. Furthermore, a token holds a string of output symbols assigned in the paths which have been passed.

Every time a signal or a feature is input, the token is propagated. That is, every time a signal or a feature is input, the state assigned to the token is changed according to the transitions of the WFST. In the case in which a single state has a plurality of outgoing transitions, the token assigned to that single state is duplicated for a number equal to the number of outgoing transitions.

Meanwhile, searching for a path using token passing is not limited to a WFST that is converted from an HMM, and can also be implemented in a digraph in which the score identifiers are assigned to the states, and in which the states to which the score identifiers are assigned have self-transitions. For example, if a template is expressed in the form of a digraph, and if a function for calculating the distance between an input feature and the template is treated as the score function; then token passing can be implemented in template matching too. In this case, a score identifier is a value representing the template itself or used in identifying the template.

Method of Dealing with HMM in WFST

Figure 3:
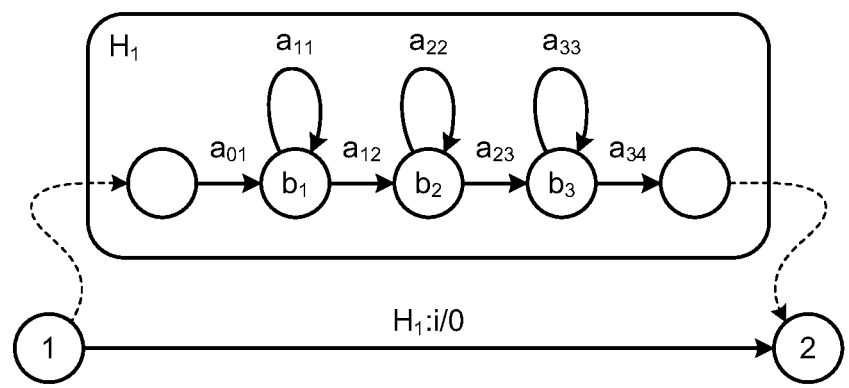
FIG. 3 is a diagram illustrating an exemplary model in which an HMM is assigned to the transitions of a weighted finite state transducer (WFST)

FIG. 3 is a diagram illustrating an exemplary model in which an HMM is assigned to the transitions of a WFST. Broadly, there are two methods for dealing with an HMM in a speech recognition decoder that searches a WFST.

In the first method, identification information is assigned to an HMM including one or more states, and the assigned identification information is assigned to the input symbols of a WFST. This first method is called an HMM expansion method. In the HMM expansion method, when a token is present that passes through a transition, the speech recognition decoder performs processes under the assumption that the HMM is included in that transition as illustrated in FIG. 3.

With reference to FIG. 3, circles having numbers written therein (in this example, numbers "1" and "2") represent the states of the WFST. Thus, an arrow pointing from the state 1 to the state 2 represents a transition in the WFST.

With reference to FIG. 3, on the left-hand side of ":" is written the input symbol. Moreover, between ":" and "/" is written the output symbol. Furthermore, on the right-hand side of "/" is written the weight. In other drawings too, the method of writing input symbols, output symbols, and weights is same. In the example illustrated in FIG. 3, regarding the transition from the state 1 to the state 2 in the WFST, identification information $H_1$ of the HMM represents the input symbol; i represents the output symbol; and 0 represents the weight.

In the case of implementing the HMM expansion method, the speech recognition decoder needs to manage the token-assigned transitions as active arcs, and needs to manage the token-assigned states as active states. For that reason, in the case of implementing the HMM expansion method, the speech recognition decoder needs to deal with the HMM and the WFST in parallel, thereby making the processes complex.

In the second method, the score identifiers that are used in identifying the algorithm or the data for signal score calculation are assigned to the input symbols of the transitions. The second method is called an HMM embedding method. In an identical manner to the HMM expansion method, in the HMM embedding method, an output symbol is assigned with a symbol that is to be output as the recognition result. An output symbol is assigned with, for example, a phoneme or a word. A weight is assigned with, for example, a state transition score of the HMM, or a signal score, or a value obtained by adding a state transition score and a signal score.

Regarding the method of assigning an input symbol to a score identifier that has been assigned to a particular state, there are two methods, namely, a method of assigning the input symbol to an outgoing transition from that particular state and a method of assigning the input symbol to an incoming transition to that particular state. The former method is called a forward assignment method, while the latter method is called a backward assignment method.

The forward assignment method is explained, for example, with reference to FIG. 1(a) disclosed in M. Mohri and M. Riley, "Combined Context-Dependent Networks in Very Large Vocabulary Speech Recognition", Sixth European Conference on Speech Communication and Technology (EUROSPEECH '99), 1999, 811-814. The backward assignment method is explained, for example, with reference to FIG. 4.2(a) in page 72 disclosed in Takaaki Hori and Atsushi Nakamura, "Speech Recognition Algorithms Using Weighted Finite-State Transducers", ISBN 978-1-60845-473-0, pp. 70-73.

In the backward assignment method, every time a feature is input, the speech recognition method performs the following processes. Firstly, it is assumed that a token is assigned to a state $q_1$, and that $e_1$ represents one of the outgoing transitions from the state $q_1$. Moreover, it is assumed that $q_2$ represents the next state of the transition $e_1$. At the first step, the speech recognition decoder propagates the token from the state $q_1$ to the state $q_2$. At that time, the speech recognition decoder adds the weight of the transition $e_1$, which has been passed, to the accumulation score of the token. At the second step, using the input symbol, that is, using the score identifier of the transition $e_1$; the speech recognition decoder calculates the signal score and adds it to the accumulation score of the token.

In the forward assignment method, every time a feature is input, the speech recognition method performs the following processes. At the first step, the speech recognition decoder calculates the signal score using the input symbol of the transition $e_1$, and adds the signal score in the accumulation score of the token of the state $q_1$. At the second step, the speech recognition decoder propagates the token from the state $q_1$ to the state $q_2$; and adds the weight of the transition $e_1$, which has been passed, to the accumulation score of the token.

For example, consider the case of the best path $a_{01} \rightarrow b_1 \rightarrow a_{11} \rightarrow b_1 \rightarrow a_{12} \rightarrow b_2 \rightarrow a_{23} \rightarrow b_3 \rightarrow a_{33} \rightarrow b_3 \rightarrow a_{34}$ illustrated in FIG. 2. In the case of implementing the backward assignment method, when the feature is input for the first time, the score related to $a_{01} \rightarrow b_1$ is calculated. Subsequently, when the feature is input for the second time, the score related to $a_{11} \rightarrow b_1$ is calculated. In the case of implementing the forward assignment method, the score related to $a_{01}$ is calculated before the feature is input for the first time. Subsequently, when the feature is input for the second time, the score related to $b_1 \rightarrow a_{11}$ is calculated.

In this way, in the HMM embedding method, the speech recognition decoder need not deal with the HMM and the WFST on an individual basis. As a result, the need for managing the active arcs is eliminated, thereby making the processes simpler.

Meanwhile, most HMMs used in speech recognition include self-transitions. In the case of implementing the HMM embedding method, if the self-transitions of an HMM are reflected in the WFST, then there occurs an increase in the volume of data that needs to be held by the speech recognition decoder. For that reason, it is often the case that, instead of including the self-transitions of an HMM in a WFST, the speech recognition decoder separately holds the state transition scores of the self-transitions in a data structure different than the WFST (for example, a data structure in which the state transition scores are included in the score function; and performs processes on the supposition that the self-transitions are included in the WFST. If the state transition scores are not going to be used, then the speech recognition decoder can ignore the state transition scores of the self-transitions. Moreover, if neither the state transition scores are going to be used nor the language model is going to be used, then there is no need to record the weights. Hence, instead of using a WFST, it is possible to use a finite state transducer in which the weights are not recorded.

Figure 4:
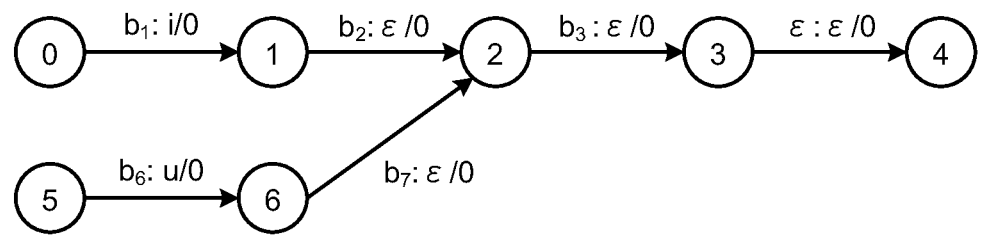
FIG. 4 is a diagram illustrating an exemplary model in which different input symbols are incoming to a single state.

FIG. 4 is a diagram illustrating an exemplary model in which two transitions assigned with different input symbols are incoming to a single state.

In the case in which the self-transitions of an HMM are not included in a WFST, there are times when WFST optimization results in a conversion that disables the speech recognition decoder to correctly deal with the self-transitions. For example, in the case of implementing the backward assignment method, as illustrated in FIG. 4, there are times when the state 2 has two incoming transitions having different input symbols. Meanwhile, in the example illustrated in FIG. 4, all weights are set to zero.

If an attempt is made to restore the original self-transitions without adding a new state to this WFST, then the state 2 cannot be restored. Consider a case in which two self-transitions, namely, a self-transition having an input symbol $b_2$ and a self-transition having an input symbol $b_7$ are added to the state 2. Then, in the case in which the state 2 is reached from the state 1, and in which the self-transition of the state 2 is to be followed; it also becomes possible to pass the self-transition having the input symbol $b_7$. As a result, a path is formed that is not supposed to be present under normal circumstances. In the forward assignment method too, if the outgoing transitions have different input symbols, an identical phenomenon occurs.

In order to solve such a problem, in the case of implementing the backward assignment method, the WFST is modified in advance in such a way that the incoming transitions to each state have the same input symbol. In the case of implementing the forward assignment method, the WFST is modified in advance in such a way that the outgoing transitions from each state have the same input symbol. For example, in the example illustrated in FIG. 4, the WFST is modified by adding a state 7; by changing the next state of the transition that is assigned with the input symbol $b_7$ to the state 7; and duplicating the outgoing transition from the state 2 is in the state 7. As a result of performing the modification, it becomes possible to correctly restore the self-transitions.

Figure 5:
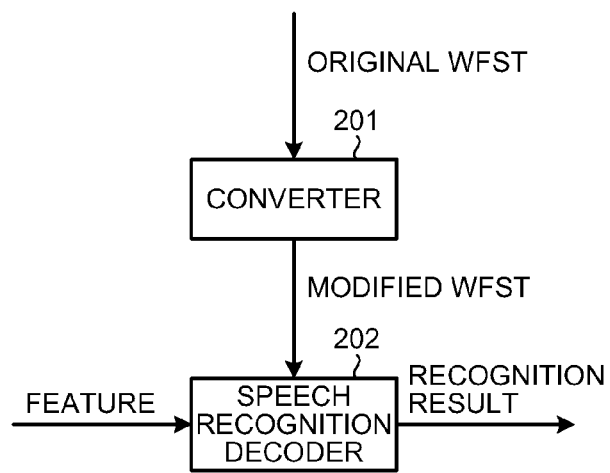
FIG. 5 is a diagram illustrating a configuration for solving the problem explained with reference to FIG. 4.

FIG. 5 is a diagram illustrating an exemplary configuration for solving the problem explained with reference to FIG. 4. For example, before the WFST is input to a speech recognition decoder 202, a converter 201 modifies the WFST in the abovementioned manner. Then, the speech recognition decoder 202 receives the modified WFST, and performs speech recognition.

However, if self-transitions are made restorable by modifying the WFST in advance, then there occurs an increase in the number of states and the number of transitions in the WFST. As a result, the speech recognition decoder 202 has to have an increased memory capacity for storing the states and the transitions.

First Embodiment

Overall Configuration

Figure 6:
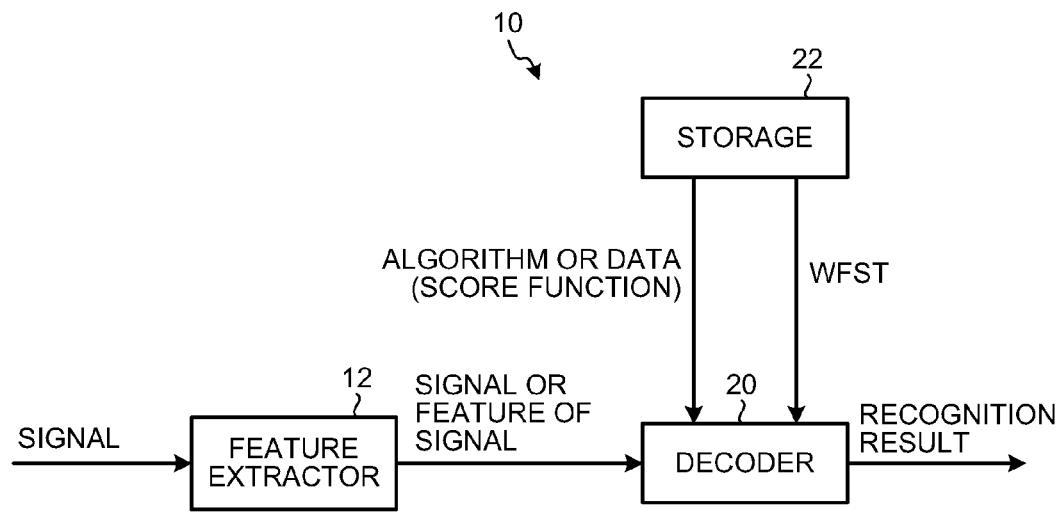
FIG. 6 is a block diagram illustrating a configuration of a pattern recognition device according to a first embodiment.

In FIG. 6 is illustrated a configuration of a pattern recognition device 10 according to a first embodiment. The following explanation is given about the pattern recognition device 10 according to the first embodiment.

The pattern recognition device 10 recognizes the pattern of input signals and outputs a recognition result. The signals input to the pattern recognition device 10 can be of any type as long as they represent patterns. Examples of the input signals include speech signals, signals representing handwriting, image signals representing characters, or moving-image signals representing gestures such as the sign language.

The pattern recognition device 10 includes a feature extractor 12, a decoder 20, and a storage 22.

The feature extractor 12 receives input of signals representing a pattern, and obtains the feature of the signals at regular time intervals. Then, the feature extractor 12 sends the obtained feature of the signals to the decoder 20.

The feature represents information indicating the section-by-section features of a signal, and is used by the decoder 20 in calculating the signal scores. When a speech signal is received as input, the feature extractor 12 obtains the feature in, for example, the units of 10 milliseconds (on a frame-by-frame basis).

Meanwhile, the duration of signals that is used in calculating the feature need not match with the period of time of outputting the feature. Moreover, in the case in which the decoder 20 calculates the signal scores using the actual signals, the feature extractor 12 can send segmented signals, which are segmented at regular intervals, to the decoder 20.

Every time the feature extractor 12 receives input of signals or the feature of signals, the decoder 20 searches a WFST that has been created in advance. Then, the decoder 20 outputs an output symbol string according to the input signal sequence or according to the feature sequence of the signals. More particularly, the decoder 20 outputs, as the recognition result, an output symbol string in the path in which the retrieved accumulation score is the best.

Herein, as the output symbol string, the decoder 20 can output, for example, a string of words, or a string of phonemes, or a symbol string of smaller units than phonemes. Alternatively, the decoder 20 can output a symbol string having a combination of the strings mentioned above.

The storage 22 is used to store a WFST that has been created in advance. The decoder 20 can constantly refer to the WFST stored in advance in the storage 22 and perform the search.

The storage 22 is used to store either the algorithm, or the data, or the algorithm and the data referred to for the purpose of calculating the signal scores. In the first embodiment, the storage 22 is used to store a score function that takes a score identifier and a signal or the feature of a signal as arguments, and calculates a signal score. Moreover, in the first embodiment, the state transition scores of the HMM that were not assigned to the transitions of the WFST as weights are also stored in the storage 22 along with the score function. Furthermore, the storage 22 can also be used to store, as data, other information that is not stored in the WFST.

Herein, the decoder 20 searches a WFST according to the token passing method. While searching the WFST, the decoder 20 can call the score function with arguments in the form of a score identifier obtained from the WFST and a signal or the feature of a signal; and calculate a signal score. Moreover, the decoder 20 can obtain the weights of the WFST from the storage 22. If the storage 22 is storing the score function as well as the state transition scores of the HMM, then the decoder 20 can obtain the state transition scores too. With that, the decoder 20 can calculate the accumulation score by accumulating the weights of the transitions in the path being searched and the signal scores. When the state transition scores of the HMM are available, they can also be accumulated in the accumulation score.

Meanwhile, the WFST stored in the storage 22 does not include the self-transitions of the HMM; and the input symbols of the WFST are assigned with the score identifiers used in calculating the signal scores. For example, the WFST stored in the storage 22 is a WFST that is converted from an HMM according to the HMM embedding method.

Moreover, in the WFST stored in the storage 22, a single state is allowed to have an incoming transition assigned with a plurality of types of input symbols. That is, the storage 22 is used to store a pre-conversion WFST that is not yet subjected to the conversion performed by the converter 201 illustrated in FIG. 5. Thus, the WFST stored in the storage 22 has a smaller number of states and a smaller number of transitions as compared to the post-conversion WFST obtained by the conversion performed by the converter 201 illustrated in FIG. 5.

Configuration of Decoder 20

Figure 7:
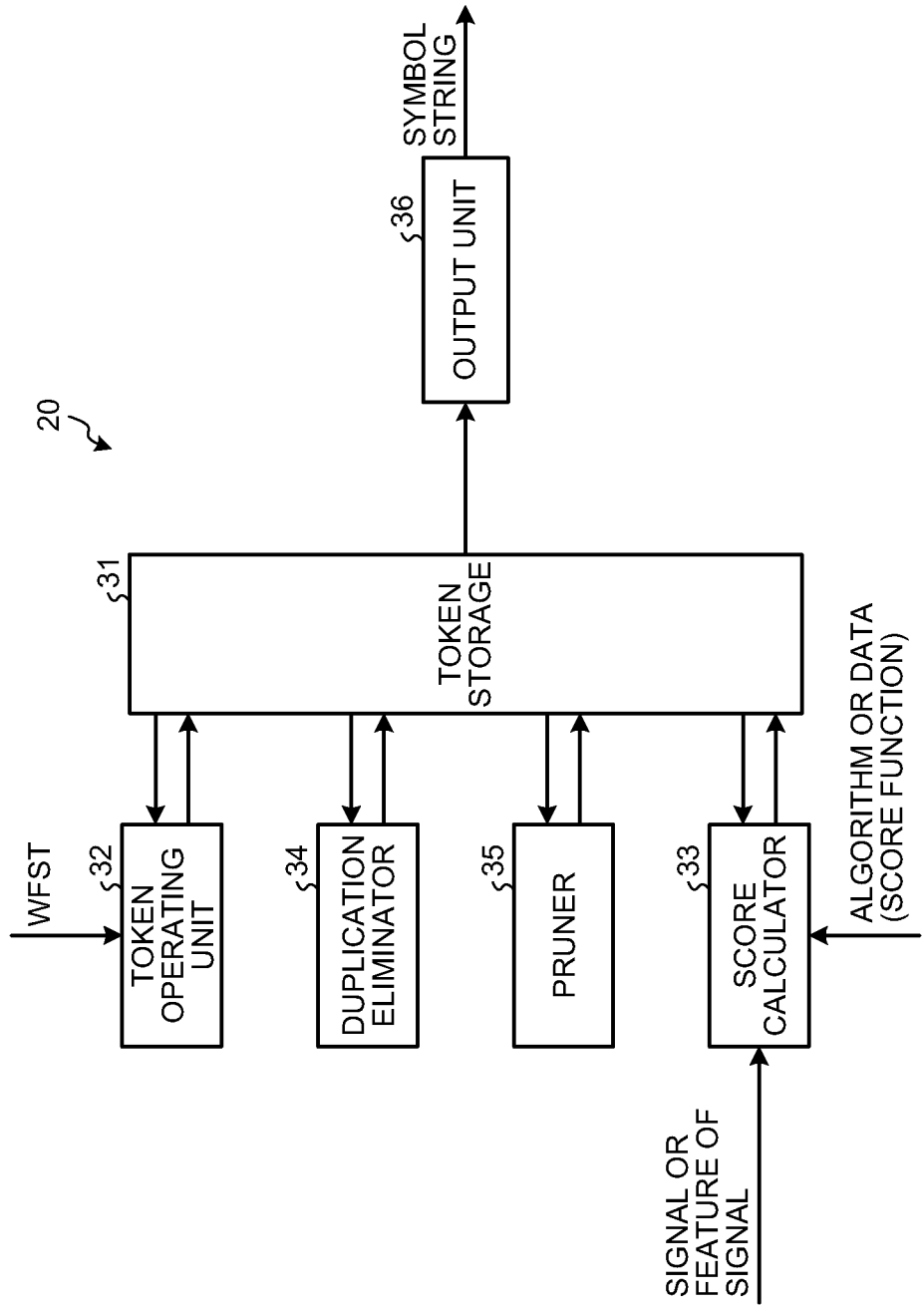
FIG. 7 is a block diagram of a decoder according to the first embodiment.

FIG. 7 is a block diagram of the decoder 20. Herein, the decoder 20 includes a token storage 31, a token operating unit 32, a score calculator 33, a duplication eliminator 34, a pruner 35, and an output unit 36.

The token storage 31 is used to store one or more tokens. Prior to the input of a signal or the feature of a signal, the token storage 31 is used to store the tokens assigned with an initial state.

In the token storage 31, each of a plurality of tokens is stored in a corresponding manner with the state assigned thereto. As long as the states of a WFST and a plurality of tokens can be held in a corresponding manner, the tokens can be stored in any arbitrary manner in the token storage 31. For example, each token can hold information indicating the state assigned thereto. If the states of the WFST are assigned with mutually different numbers, then each token can hold that number as the information indicating the state assigned thereto. If the states are held in a memory, then the addresses in the memory at which the states are recorded can be used as the information indicating the states assigned to the tokens. Meanwhile, in the token storage 31, the states and the tokens can be managed in a corresponding manner using a table representing the states of the WFST.

Each of a plurality of tokens holds the input symbol (the score identifier) assigned to the previously-passed transition. Moreover, each of a plurality of tokens holds an output symbol string in which the output symbols from the starting state to the reached state in the corresponding path are connected. Furthermore, each of a plurality of tokens holds an accumulation score obtained by accumulating the signal scores, which are calculated from the input symbols (the score identifiers) present in the path represented by the token, and the weights (the state transition scores) assigned to the transitions in the path.

Every time a signal or the feature of a signal is input, the token operating unit 32 propagates each of a plurality of tokens, which is stored in the token storage 31, according to the WFST. Herein, propagating a token implies changing the state assigned to the token to the next state.

In this case, if the state assigned to a token has a plurality of outgoing transitions, then the token operating unit 32 creates a token corresponding to each of a plurality of transitions and propagates each created token according to the corresponding transition to the next state. Moreover, if an outgoing transition from a state assigned to a token is assigned with an empty input symbol, then the token operating unit 32 propagates the token until a transition assigned with a non-empty input symbol is passed.

Every time the token operating unit 32 propagates the tokens until a transition assigned with a non-empty input symbol is passed, the score calculator 33 calculates the signal score and the accumulation score with respect to each of a plurality of tokens. More specifically, with respect to each of a plurality of tokens, the score calculator 33 calls the score function that corresponds to the input symbol (the score identifier) assigned to the transition which was passed due to the previous propagate, and calculates the signal score based on the input symbol. Moreover, with respect to each of a plurality of tokens, the score calculator 33 calculates the accumulation score by accumulating the weights and the signal scores in the path represented by the concerned token. Then, the score calculator 33 instructs the tokens, which are stored in the token storage 31, to hold the respective signal scores and the respective accumulation scores. Meanwhile, in the case of searching a finite state transducer not having the weights attached thereto, the score calculator 33 does not perform processes related to the weights and calculates the accumulation score with the weights set to zero.

Every time the token operating unit 32 propagates the tokens until a transition assigned with a non-empty input symbol is passed, the duplication eliminator 34 eliminates the duplication of tokens. More specifically, the duplication eliminator 34 eliminates the duplication of such two or more tokens which have the same state assigned thereto and for which the respective previously-passed transitions are assigned with the same input symbol. As an example, the duplication eliminator 34 keeps only one token having a suitable accumulation score and destroys the remaining tokens out of the two or more tokens which have the same state assigned thereto and for which the respective previously-passed transitions are assigned with the same input symbol.

In this case, the duplication eliminator 34 rearranges a plurality of tokens, which is recorded in an array, in such a way that the tokens which have the same state assigned thereto and for which the respective previously-passed transitions are assigned with the same input symbol are placed next to each other. Then, the duplication eliminator 34 can compare the adjacent pairs of tokens from among the tokens recorded in an array, and can detect two or more tokens which have the same state assigned thereto and for which the respective previously-passed transitions are assigned with the same input symbol.

Alternatively, with respect to each of a plurality of tokens, the duplication eliminator 34 can calculate a hash value of the assigned state and the input symbol assigned to the previously-passed transition. Then, the duplication eliminator 34 can compare the calculated hash values, and can detect two or more tokens which have the same state assigned thereto and for which the respective previously-passed transitions are assigned with the same input symbol.

Moreover, the duplication eliminator 34 generates sets of tokens, each set of which includes tokens for which the respective previously-passed transitions are assigned with the same input symbol. Then, for each set of tokens, the duplication eliminator 34 can determine that the same state is assigned, and can detect two or more tokens which have the same state assigned thereto and for which the respective previously-passed transitions are assigned with the same input symbol.

Every time the token operating unit 32 propagates the tokens until a transition assigned with a non-empty input symbol is passed; the pruner 35 eliminates the tokens, from among a plurality of tokens stored in the token storage 31, which have the accumulation score worse than a certain score. As an example, the pruner 35 eliminates the tokens having the accumulation score worse by a certain score than the best of the accumulation scores of a plurality of tokens.

Upon completion of the input of a signal or the input of the feature of a signal, the output unit 36 detects, from among a plurality of tokens stored in the token storage 31, the token having the best accumulation score. Then, the output unit 36 outputs, as the recognition result, the output symbol string held in the detected token.

Process Flow

Figure 8:
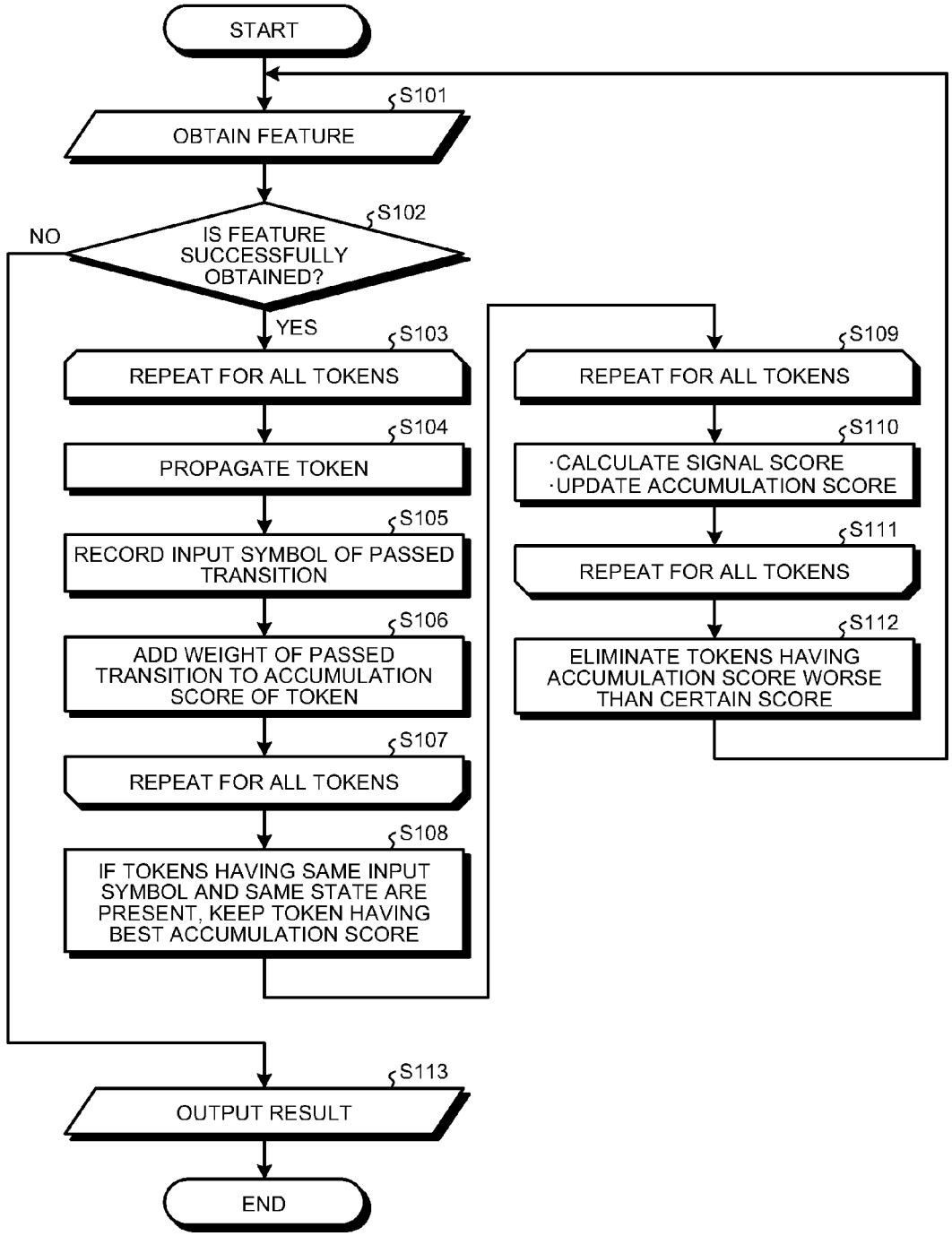
FIG. 8 is a flowchart for explaining a sequence of processes by the decoder according to the first embodiment.

FIG. 8 is a flowchart for explaining a sequence of processes of the decoder 20 according to the first embodiment. Once the input of a signal starts, the feature extractor 12 extracts the feature from the signal and sends it to the decoder 20. Then, the processes from Step S101 are performed in the decoder 20.

Firstly, the decoder 20 obtains the feature from the feature extractor 12 (Step S101). Then, the decoder 20 determines whether or not the feature is successfully obtained (Step S102). If the feature is successfully obtained (Yes at Step S102), the system control proceeds to a loop process from Step S103 to Step S107. Meanwhile, the decoder 20 can perform the process at Step S102 before performing the process at Step S101. In that case, at Step S102, the decoder 20 determines whether or not the next feature can be obtained.

During the loop process from Step S103 to Step S107, the decoder 20 performs the processes from Step S104 to Step S106 with respect to each token. That is, the decoder 20 propagates the concerned token from the state assigned thereto to the next state according to the transitions illustrated in the WFST. In this case, the decoder 20 propagates the concerned token until a transition assigned with a non-empty input symbol is passed (Step S104).

Then, the decoder 20 records, in the concerned token, the input symbol assigned to the previously-passed transition (Step S105). Subsequently, the decoder 20 obtains the weights that are assigned to the transitions passed by the concerned token, and adds the weights to the accumulation score of the token (Step S106).

Once the loop process from Step S103 to Step S107 is completed, the system control proceeds to Step S108. Then, the decoder 20 detects whether there exist two or more tokens which have the same state assigned thereto and for which the respective previously-passed transitions are assigned with the same input symbol (Step S108). Subsequently, the decoder 20 keeps only one token having the best accumulation score and destroys the remaining tokens.

Then, a loop process from Step S109 to Step S111 is performed in the decoder 20. During the loop process from Step S109 to Step S111, the decoder 20 performs the process at Step S110 with respect to each token. That is, the decoder 20 calculates the signal score of the concerned token (Step S110). Then, the decoder 20 adds the signal score to the accumulation score held by the concerned token, and thus updates the accumulation score.

Once the loop process from Step S109 to Step S111 is completed, the system control proceeds to Step S112. Then, the decoder 20 eliminates the tokens having the accumulation score worse than a certain score (Step S112). Subsequently, the system control returns to Step S101. Herein, every time a feature is input, the decoder 20 repeatedly performs the processes from Step S103 to Step S112.

Meanwhile, if the feature is not successfully obtained, that is, if the input of signal ends (No at Step S102); then the system control proceeds to Step S113.

Then, the decoder 20 detects the token having the best accumulation score from among a plurality of tokens (Step S113). Subsequently, the decoder 20 outputs, as the recognition result, the output symbol string held by the token having the best accumulation score. The completion of the process at Step S113 marks the end of the flow of processes.

Pseudo Code

FIG. 9 is a diagram illustrating a pseudo code for the processes performed in the decoder 20 according to the first embodiment. Thus, with reference to the pseudo code that is illustrated in FIG. 9 and that is executed by the decoder 20, the explanation is given about the detailed processes performed in the decoder 20.

Herein, t represents a token; T represents a set of tokens; and $T_p$ represents a set of tokens in the initial states or a set of tokens at the previous timing. The set of tokens at the previous timing points to the set of tokens obtained by the operation performed immediately before at the 13-th line.

Moreover, state(t) represents the state assigned to the token t. Furthermore, score(t) represents the accumulation score held by the token t. Moreover, input(t) represents the input symbol held by the token t. Furthermore, word(t) represents the output symbol string held by the token t. If the token t is to be represented as a 4-tuple, it is written as (state, input symbol, score, output symbol string).

In this pseudo code, the processes are performed on the premise that a greater score is more suitable. Alternatively, if the function "max" in the pseudo code is changed to the function "min", and if the magnitude relationship during the comparison is reversed; then the processes can be performed on the premise that a smaller score is more suitable.

Meanwhile, $W_{beam}$ represents a score difference that serves as the reference for pruning.

Moreover, $\epsilon$ represents that a symbol string is empty. When $\epsilon$ represents an input symbol, it implies that no score identifier is assigned to the input symbol. In an identical manner, when $\epsilon$ represents an output symbol; it implies that the information output as the recognition result, such as words, is not assigned to the output symbol.

In the first embodiment, a transition having $\epsilon$ as the input symbol is called an $\epsilon$ transition or an empty transition. Meanwhile, regarding a transition e, the next state is expressed as n(e). Moreover, input(e) represents the input symbol of the transition e, and output(e) represents the output symbol of the transition e. Furthermore, w(e) represents the weight of the transition e.

Usually, a WFST has an initial weight. However, in the first embodiment, the initial weight and the final weight of a WFST is equal to zero. A WFST can be modified in advance in such a way that a single transition and a single state are added with respect to a single initial state and are assigned to a transition having the initial weight added thereto. If a pseudo code is to be written by taking into account the initial weight, then the initial weight can be added to an accumulation weight of tokens that is created at the first line. If the final weight is to be taken into account, then the calculation of argmax at the 14-th line can be done after adding the final weight to the score present at the time of argmax calculation.

Given below is the explanation of the operation performed at each line. The decoder 20 performs the operations written at each line of the pseudo code illustrated in FIG. 9 in a sequential manner starting from the first line.

At the first line, the decoder 20 initializes the set of tokens. Herein, as an example, the set of tokens can be implemented using an array, a singly linked list, or a binary tree. Meanwhile, since overlapping elements cease to exist at the ninth line, the decoder 20 may or may not delete the overlapping elements at the first line.

At the second line, the decoder 20 determines whether or not the input of signals is completed. If the input of signals is completed, then the decoder 20 proceeds to the operation at the 14-th line for outputting the result. However, if any signal is yet to be processed, then the decoder 20 performs the operations from the third line to the 13-th line.

At the third line, the decoder 20 receives, from the feature extractor 12, the feature of the input signal; and substitutes the feature into v. In the pseudo code, the feature is written as feature vector.

At the fourth line, the tokens having $\epsilon$ as the input symbol are eliminated, and then the set T is copied in the set $T_p$. Since the WFST referred to by the decoder 20 does not include the self-transitions of the HMM, the tokens need to be propagated on the supposition that the self-transitions are present. Regarding each state of the WFST, as long as an incoming transition does not have $\epsilon$ as the input symbol, the state has self-transitions. If the input symbol held in a token is not $\epsilon$, then it implies that the input symbol of the transition is not $\epsilon$. Thus, at the fourth line, by eliminating the tokens having $\epsilon$ as the input symbol, the decoder 20 can deal with self-transitions.

The fifth line indicates that the operations from the sixth line to the eighth line are performed for each token included in the set $T_p$.

A function "outgoing" returns a set of outgoing transitions from the state(t) in the case in which the WFST does not include $\epsilon$ transitions.

However, when the WFST includes $\epsilon$ transitions, the function "outgoing" returns a set $E_n$ that includes the outgoing transitions from the state(t) excluding the $\epsilon$ transitions and includes the transitions which can be reached by following $\epsilon$ transitions from the state(t) and which do not have $\epsilon$ as the input symbol. If there is a plurality of paths to reach such a transition, then the function "outgoing" selects only one path in which the value obtained by accumulating the weights is the greatest. In order to search for the path in which the value obtained by accumulating the weights is the greatest, for example, it is possible to implement the Dijkstra algorithm or the Bellman-Ford algorithm.

Moreover, the function "outgoing" modifies the weight of each transition $e_n$ included in the set $E_n$ into a value obtained by accumulating the weights in the path from the state(t) to the transition $e_n$ (including the transition $e_n$). Moreover, the function "outgoing" modifies the output symbol of each transition $e_n$ included in the set $E_n$ into a symbol string in which the output symbols in the path from the state(t) to the transition $e_n$ (including the transition $e_n$) are concatenated.

In the case in which the paths up to the transition $e_n$ include a plurality of output symbol strings all of which are to be kept, the function "outgoing" can be configured in the following manner. Assume that $x_n$ represents an output symbol string in a particular path. Moreover, assume that $w_n$ represents a value obtained by adding the greatest weight, from among the weights in the paths assigned with the same output symbol string as the output symbol string $x_n$, and the weight of the transition $e_n$. Then, in the set to be returned as the processing result, the function "outgoing" adds a transition having the output symbol string $x_n$, having the weight $w_n$, and having the remaining elements to be same as the transition $e_n$.

At the seventh line, the decoder 20 creates a new token $t_{new}$. The state assigned to the token $t_{new}$ is the next state of the transition e. Moreover, the accumulation score of the token $t_{new}$ is a value obtained by adding the weight of the transition e to the accumulation score of the token t. Furthermore, the output symbol string of the token $t_{new}$ is a symbol string obtained by concatenating the output symbol string of the transition e at the end of the output symbol string of the token t.

At the eighth line, the decoder 20 adds the token $t_{new}$, which is created at the seventh line, to the set T of tokens.

At the ninth line, the decoder 20 detects whether there are two or more tokens which have the same state assigned thereto and for which the respective previously-passed transitions are assigned with the same input symbol. If there are two or more tokens which have the same state assigned thereto and for which the respective previously-passed transitions are assigned with the same input symbol, the decoder 20 keeps only one token having the best accumulation score and eliminates the remaining tokens.

For example, the decoder 20 rearranges a plurality of tokens, which is recorded in an array, in such a way that the tokens which have the same state assigned thereto and for which the respective previously-passed transitions are assigned with the same input symbol are placed next to each other. Then, the decoder 20 compares the adjacent pairs of tokens from among the tokens recorded in an array, and detects two or more tokens which have the same state assigned thereto and for which the respective previously-passed transitions are assigned with the same input symbol.

Alternatively, for example, the decoder 20 calculates a hash value using a hash function that takes an input symbol and a state as arguments, and detects the tokens for which the calculated hash value is identical. If two or more tokens are detected for which the hash value is identical, then the decoder 20 compares the input symbols and the assigned states of those tokens.

Moreover, the decoder 20 generates sets of tokens, each set of which includes tokens for which the respective previously-passed transitions are assigned with the same input symbol. For each set of tokens, the decoder 20 determines that the same state is assigned, and detects two or more tokens which have the same state assigned thereto and for which the respective previously-passed transitions are assigned with the same input symbol. In this way, the decoder 20 can easily detect two or more tokens for which the respective previously-passed transitions are assigned with the same input symbol and which have the same state assigned thereto.

The 10-th line indicates that the operation at the 11-th line is performed for each token t included in the set T of tokens.

At the 11-th line, the decoder 20 calculates a signal score using a score function "am_score", which takes a feature as the first argument and takes a score identifier (an input symbol) as the second argument, and returns a signal score. In the case in which a state transition score of the HMM is present, the score function "am_score" returns a signal score including the state transition score. The value calculated using the score function "am_score" is added to the accumulation score score(t) of the token t.

At the 12-th and 13-th lines, pruning of the tokens is performed. At the 12-th line, from among the accumulation scores of the tokens included in the set T of tokens, the decoder 20 substitutes the best accumulation score in $w_{max}$.

At the 13-th line, the decoder 20 eliminates, from the set T of tokens, such tokens which hold the accumulation score equal to or smaller than the value obtained by subtracting $w_{beam}$ from $w_{max}$. Herein, $w_{beam}$ can either be a fixed value set in advance or a value calculated in such a way that the number of tokens is within a certain number. Meanwhile, the method of performing pruning according to the number of tokens is called histogram pruning.

At the 14-th line, from among the tokens assigned with a final state of the WFST, the decoder 20 detects the token having the greatest accumulation score and outputs, as the recognition result, the output symbol string held by the detected token.

Example of Token Elimination

Figure 11:
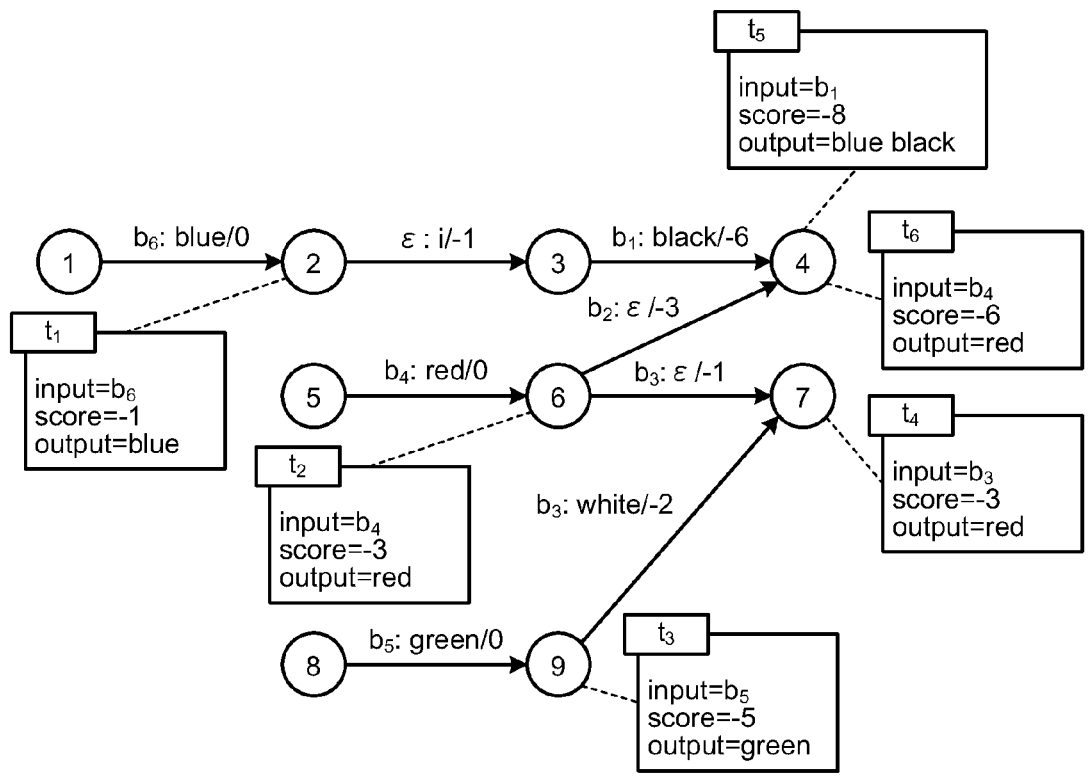
FIG. 11 is a diagram illustrating an example of tokens included in the set $T_p$ after token propagating has been done.

FIG. 10 is a diagram illustrating an example of pre-propagating tokens included in the set $T_p$. FIG. 11 is a diagram illustrating an example of tokens included in the set $T_p$ after the tokens illustrated in FIG. 10 have been propagated. The following explanation is given about the tokens that are kept without elimination during the propagating of tokens. Meanwhile, in FIGS. 10 and 11, only a part of the WFST is illustrated, and the initial states and the final states are not illustrated.

In the state prior to propagating the tokens (in the state illustrated in FIG. 10), a token $t_1$ is assigned to the state 2, a token $t_2$ is assigned to a state 6, a token $t_3$ is assigned to a state 9, and a token $t_4$ is assigned to the state 7. Thus, the set $T_p$ of pre-propagating tokens is $T_p=\{(2, b_6, -1, \text{blue}), (6, b_4, -3, \text{red}), (9, b_5, -5, \text{green}), (7, b_3, -3, \text{red})\}$. Even in the case in which the tokens included in the set $T_p$ are propagated along self-transitions that are not explicitly expressed, the same result is achieved. Hence, at the point of time of completion of the operation at the fourth line in the pseudo code illustrated in FIG. 9, $T=T_p$ holds true.

Upon completion of the operations from the fifth line to the eighth line in the pseudo code illustrated in FIG. 9, the tokens that have been propagated along the transitions are added. Thus, $T_p=\{(2, b_6, -1, \text{blue}), (6, b_4, -3, \text{red}), (9, b_5, -5, \text{green}), (7, b_3, -3, \text{red}), (4, b_1, -8, \text{blue black}), (4, b_4, -6, \text{red}), (7, b_3, -4, \text{red}), (7, b_3, -7, \text{green white})\}$ holds true.

As a result of performing the operation at the ninth line in the pseudo code illustrated in FIG. 9, if there are tokens which have the same state assigned thereto and for which the respective previously-passed transitions are assigned with the same input symbol, only one token having the best accumulation score (in this example, the greatest accumulation score) is kept. Meanwhile, if there are tokens having the same and the best accumulation score, then the decoder 20 can keep an arbitrary token from among those tokens. In this case, the decoder 20 can select a token in a random manner, or can select a token corresponding to the smallest address value in the memory in which the tokens are recorded, or can select a token corresponding to the greatest address value in the memory in which the tokens are recorded.

Upon completion of the operation at the ninth line in the pseudo code illustrated in FIG. 9, $T=\{(2, b_6, -1, \text{blue}), (6, b_4, -3, \text{red}), (9, b_5, -5, \text{green}), (7, b_3, -3, \text{red}), (4, b_1, -8, \text{blue black}), (4, b_4, -6, \text{red})\}$ holds true as illustrated in FIG. 10. Thus, $(7, b_3, -4, \text{red})$ and $(7, b_3, -7, \text{green white})$ are eliminated because of having a smaller score as compared to $(7, b_3, -3, \text{red})$.

Hardware Configuration

Figure 12:
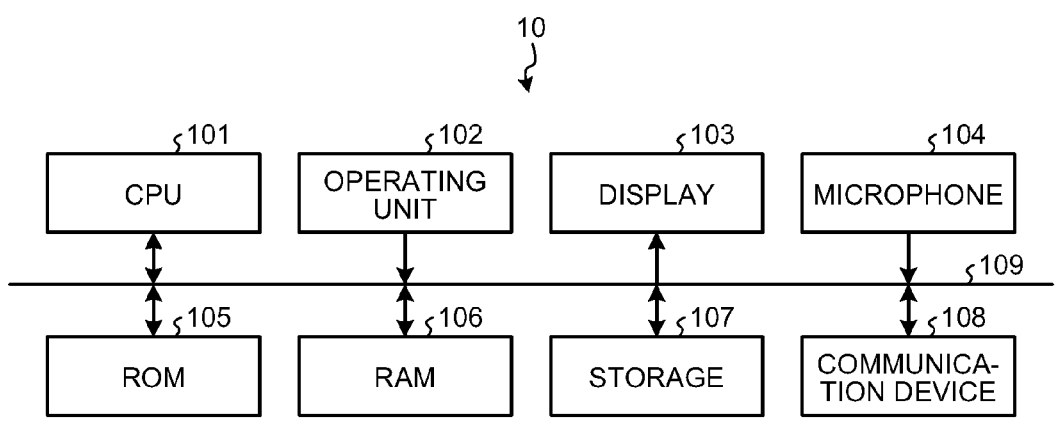
FIG. 12 is a hardware block diagram of the pattern recognition device according to the first embodiment.

FIG. 12 is a hardware block diagram of the pattern recognition device 10 according to the first embodiment. The pattern recognition device 10 includes a central processing unit (CPU) 101, an operating unit 102, a display 103, a microphone 104, a read only memory (ROM) 105, a random access memory (RAM) 106, a storage 107, a communication device 108, and a bus 109 that interconnects each of these constituent elements.

The CPU 101 uses a predetermined area in the RAM 106 as the work area and performs various processes in cooperation with various computer programs stored in advance in the ROM 105 or the storage 107; and performs an overall control of the constituent elements (the feature extractor 12 and the decoder 20) of the pattern recognition device 10. Moreover, in cooperation with the computer programs stored in advance in the ROM 105 or the storage 107, the CPU 101 implements the operating unit 102, the display 103, the microphone 104, and the communication device 108.

The operating unit 102 is an input device such as a mouse or a keyboard that receives instruction signals in the form of information input by a user by operating the operating unit 102, and outputs the instruction signals to the CPU 101.

The display 103 is a display device such as a liquid crystal display (LCD). Based on display signals received from the CPU 101, the display 103 displays a variety of information. For example, the display 103 displays the recognition result output by the decoder 20. Meanwhile, if the recognition result is output to the communication device 108 or the storage 107, then the pattern recognition device 10 may not include the display 103.

The microphone 104 is a device that receives input of speech signals. In the case in which pattern recognition is to be done with respect to prerecorded speech signals or with respect to speech signals input from the communication device 108, the pattern recognition device 10 may not include the microphone 104.

The ROM 105 is used to store, in a non-rewritable manner, computer programs and a variety of setting information to be used in controlling the pattern recognition device 10. The RAM 106 is a volatile storage medium such as a synchronous dynamic random access memory (SDRAM). The RAM 106 serves as the work area of the CPU 101. More particularly, the RAM 106 functions as a buffer for temporarily storing various variables and parameters used by the pattern recognition device 10.

The storage 107 is a rewritable recording device such as a storage made of a semiconductor such as a flash memory, or a storage medium capable of magnetic or optical recording. The storage 107 is used to store the computer programs and a variety of setting information used in controlling the pattern recognition device 10. Moreover, the storage 107 is used to store computer programs and a variety of setting information used in controlling the pattern recognition device 10. Moreover, the storage 107 is also used to store in advance the parameters of the score function and a variety of WFST-related information.

The communication device 108 communicates with an external device, and is used in receiving input of speech signals and in outputting the recognition result. In the case in which pattern recognition is to be done with respect to prerecorded speech signals or speech signals input from the microphone 104 and in which the recognition result is to be output to the display 103 or the storage 107, the pattern recognition device 10 may not include the communication device 108.

Meanwhile, in the case of performing pattern recognition of handwritten characters, the pattern recognition device 10 further includes a handwriting input device. Alternatively, in the case of performing optical character recognition (OCR), the pattern recognition device 10 further includes a scanner or a camera. Still alternatively, in the case of performing gesture recognition, hand signal recognition, or sign language recognition; the pattern recognition device 10 further includes a video camera that imports dynamic image signals. In these cases, since speech signals are not required in pattern recognition, the pattern recognition device 10 may not include the microphone 104.

The computer programs executed in the pattern recognition device 10 according to the first embodiment are recorded as installable or executable files in a computer-readable storage medium such as a compact disk read only memory (CD-ROM), a flexible disk (FD), a compact disk readable (CD-R), or a digital versatile disk (DVD), which may be provided as a computer program product.

Alternatively, the computer programs executed in the pattern recognition device 10 according to the first embodiment can be saved as downloadable files on a computer connected to the Internet or can be made available for distribution through a network such as the Internet. Alternatively, the computer programs executed in the pattern recognition device 10 according to the first embodiment can be stored in advance in a ROM or the like.

The computer programs executed in the pattern recognition device 10 according to the first embodiment contain a module for the feature extractor 12 and the decoder 20 (the token storage 31, the token operating unit 32, the score calculator 33, the duplication eliminator 34, the pruner 35, and the output unit 36). The CPU 101 (the processor) reads the computer programs from a memory medium and executes them so that each constituent element is loaded in a main storage device. As a result, the feature extractor 12 and the decoder 20 (the token storage 31, the token operating unit 32, the score calculator 33, the duplication eliminator 34, the pruner 35, and the output unit 36) are generated in the main memory device. Meanwhile, the feature extractor 12 and the decoder 20 can be configured entirely or partially using hardware.

Effect

As described above, the decoder 20 according to the first embodiment uses a WFST in which the input symbols are assigned with score identifiers used in identifying a score function. Hence, in the decoder 20 according to the first embodiment, it is no more required to separately hold the data regarding the process of assigning tokens to transitions and the data regarding the HMM excluding the parameters of the score function. As a result, the configuration becomes simple.

Then, the decoder 20 according to the first embodiment eliminates the duplication of tokens which have the same state assigned thereto and for which the respective previously-passed transitions are assigned with the same input symbol. As a result, the decoder 20 no more needs to expand the WFST in such a way that, in order to correctly deal with the self-transitions, the incoming transitions to a single state are assigned with only one type of input symbols. Therefore, it becomes possible to reduce the number of states and the number of transitions, thereby achieving reduction in the memory area.

Second Embodiment

Figure 13:
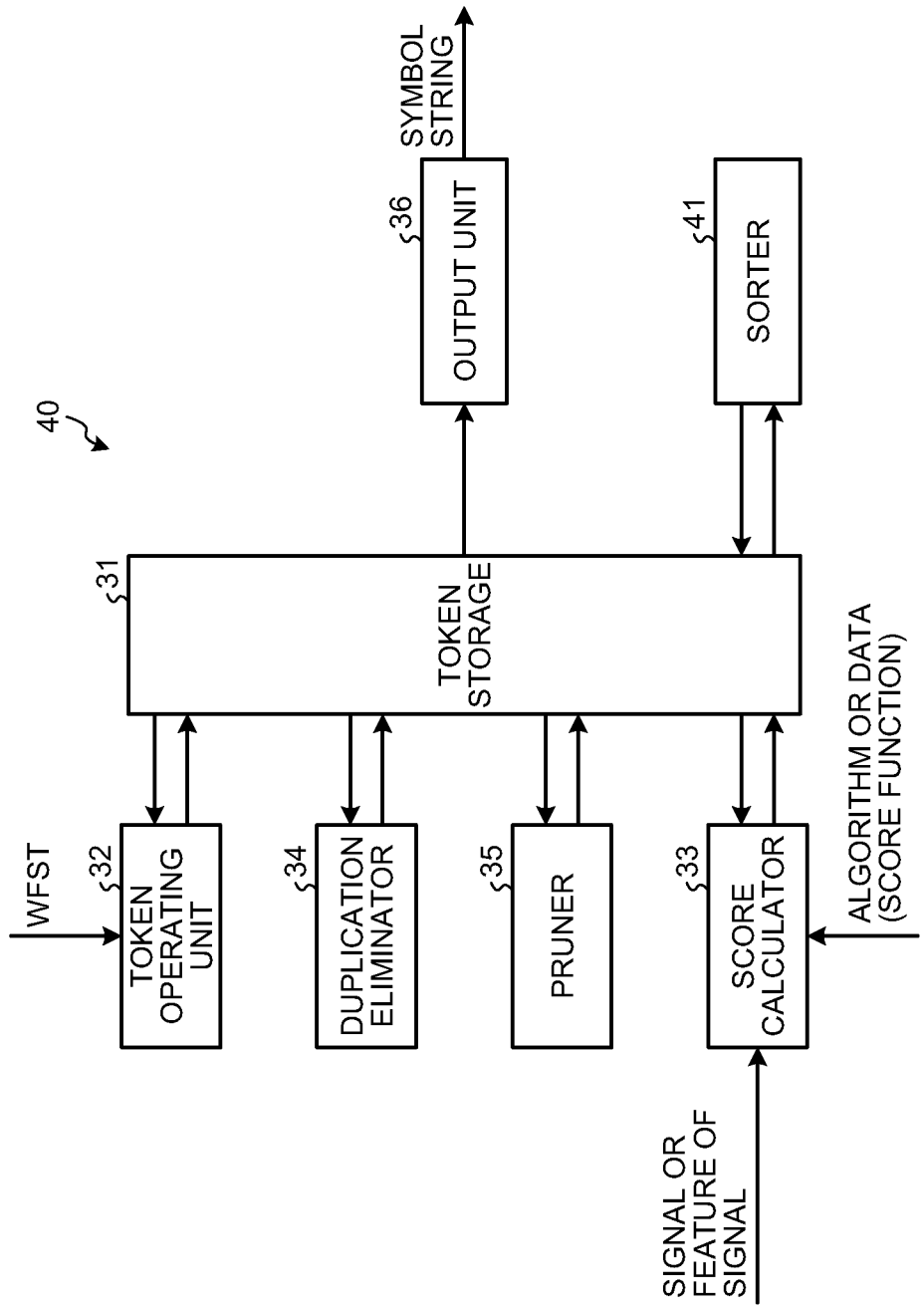
FIG. 13 is a block diagram of a decoder according to a second embodiment.

FIG. 13 is a block diagram of a decoder 40 according to a second embodiment. FIG. 14 is a diagram illustrating a pseudo code for the processes performed in the decoder 40 according to the second embodiment.

In the pattern recognition device 10, the decoder 40 according to the second embodiment is installed in place of the decoder 20 according to the first embodiment. The configuration of the decoder 40 and the computer programs executed therein are substantially identical to the decoder 20 according to the first embodiment. Hence, regarding the identical functions and configuration, same reference numerals are used in the drawings. Moreover, the detailed explanation of the identical functions and configuration is not repeated. That is, the explanation is given only about the differences.

The decoder 40 further includes a sorter 41, which sorts (rearranges) a plurality of tokens stored in the token storage 31.

There are times when a plurality of tokens holds the same score identifier. For that reason, at the 11-th line in the pseudo code illustrated in FIG. 9, there are times when the decoder 40 calls the score function with the same arguments. In that regard, the score function makes use of a cache for storing two or more calculation results and, when the arguments are same, returns the stored calculation result without performing recalculation. As a result, in the case of being called with the same arguments, the score function can achieve reduction in the amount of calculation of.

However, if the cache increases in size, the memory area of the decoder 40 also increases. In that regard, the sorter 41 sorts a plurality of tokens, which is stored in the token storage 31, in such a way that not only the score function is spared from performing recalculation in the case in which the arguments are same but also the memory area for storing the calculation results of the score function is reduced.

More particularly, the sorter 41 sorts a plurality of tokens in such a way that the tokens holding the same type of input symbols are clubbed together. Then, the score calculator 33 calculates the signal score once for each input symbol. For example, the score calculator 33 has a memory area for storing only the previously-calculated signal score. Thus, with respect to the same input symbol, the score calculator 33 calculates the signal score only once. However, from the second time onward, instead of calculating the signal score, the score calculator 33 outputs the signal score from the memory area.

As an example, the sorter 41 assigns the input symbols to the index of an associative array, and assigns the sets of tokens to the values of the associative array. With that, the sorter 41 can ensure that the set of token included in each value has the same input symbol. For example, in place of the operations at the ninth line to the 11-th line in the pseudo code illustrated in FIG. 9, the decoder 40 executes the pseudo code illustrated in FIG. 14.

As a result, the decoder 40 no more calls the score function for more than once with the same arguments. In the pseudo code illustrated in FIG. 14, Y represents a set of 2-tuple (input symbol, set of tokens). Of the 2-tuple included in the set Y, the first element in the form of an input symbol is not duplicated.

Meanwhile, in a particular 2-tuple, if the first value is assumed to be "i" and the second value is assumed to be "$T_i$"; then the input symbols held by the tokens included in the set $T_i$ are all "i". Thus, as illustrated at the 12-th line illustrated in FIG. 14, firstly, a score function am_score is called and the result thereof is substituted in "s". With that, at the 14-th line, the score function need not be called.

Meanwhile, the token storage 31 can hold the sets of tokens in an array. With that, the sets of tokens can be stored in the token storage 31 without changing the data structure in a large way.

In this case, in order to perform the operation at the ninth line in the pseudo code illustrated in FIG. 9, firstly, the sorter 41 sorts the tokens. Then, the duplication eliminator 34 determines whether or not the adjacent tokens have the same input symbol and the same state. Meanwhile, in this case, the sorter 41 assigns a first key to the input symbols, and assigns a second key to the states; and sorts the tokens with priority given to the first key. As a result, the sorter 41 can arrange the tokens having the same input symbols next to each other.

Moreover, in this case, the duplication eliminator 34 calculates the signal score of each token in order from the start of the array. Furthermore, the duplication eliminator 34 stores only the previously-calculated signal score. Thus, if the j-th token in the array has the same input symbol as the input symbol of the j−1-th token, then the duplication eliminator 34 can set the signal score corresponding to the j-th token to be equal to the acoustic score corresponding to the j−1-th token. Consequently, in such a case, the sorter 41 need not call the score function.

Herein, the sorter 41 can perform sorting according to any algorithm such as the quick sort or the merge sort. Moreover, the score identifiers, that is, the input symbols are represented using integer values equal to zero or greater. If the greatest possible value of an input symbol is within the recordable range in the memory area, then the sorter 41 can sort the input symbols according to the bucket sort.

Thus, according to the second embodiment, in order to detect the tokens having the same input symbols and the same states, the decoder 40 clubs the tokens together according to the input symbols (the score identifiers). As a result, for each input symbol, the decoder 40 can limit calling the score function only once corresponding to the input of a signal or a feature and the input symbol at a particular timing. Hence, using the decoder 40, not only it becomes possible to reduce the amount of calculation of the signal scores, but it also becomes possible to reduce the memory area for storing the calculation results.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoder adapted to search a path according to a signal sequence that is input or according to a feature sequence of the signal sequence that is input in a finite state transducer, and to output an output symbol string on the path, the finite state transducer including at least one state which has two or more incoming transitions and at least one transition assigned with an empty input symbol, the decoder comprising:
   a processor that executes instructions to perform operations, comprising:
      in response to every time a signal included in the signal sequence or a feature included in the feature sequence is input, propagating each of a plurality of tokens, which is assigned with a state of the head of a path being searched, according to a transition of the finite state transducer; and
      eliminating duplication of two or more tokens which have the same state assigned thereto and for which respective previously passed transitions are assigned with the same input symbol, wherein in propagating each of the plurality of tokens according to transitions of the finite state transducer, changing a state assigned to the token to a next state which is connected to an outgoing transition from the state assigned to the token, if the state assigned to the token has a plurality of outgoing transitions, generating a new token corresponding to each of the plurality of outgoing transitions and, assigning the new token with a next state which is connected to an outgoing transition, and if an outgoing transition from the state assigned to the token is assigned with an empty input symbol, propagating the token until a transition assigned with a non-empty input symbol is passed, and
      in eliminating of the duplication of the two or more tokens, every time the token is propagated until a transition assigned with a non-empty input symbol is passed, keeping one token among the two or more tokens and destroying residual tokens.

2. The decoder according to claim 1, wherein each of the plurality of tokens holds an input symbol of a corresponding previously-passed transition.

3. The decoder according to claim 1, wherein each of the plurality of tokens holds information indicating a state assigned thereto.

4. The decoder according to claim 3, wherein
   each state in the finite state transducer is assigned with a mutually different number, and
   each of the plurality of tokens holds a number of the state assigned thereto.

5. The decoder according to claim 1, wherein
   each of the plurality of tokens is stored in an array, and
   wherein the operations further comprise:
      rearranging the plurality of tokens, which is recorded in the array, in such a way that the tokens which have the same state assigned thereto and for which respective previously-passed transitions are assigned with the same input symbol are clubbed together,
      comparing adjacent tokens from among the plurality of tokens recorded in the array, and
      detecting two or more tokens which have the same state assigned thereto and for which respective previously-passed transitions are assigned with the same input symbol.

6. The decoder according to claim 5, wherein
   input symbols are integers, and
   wherein the operations further comprise sorting the plurality of tokens by performing a bucket sort with respect to assigned states and the input symbols.

7. The decoder according to claim 1, wherein the operations further comprise:
   with respect to each of the plurality of tokens, calculating a signal score based on an input symbol of a corresponding previously-passed transition; and
   generating a set of tokens for the input symbols of the previously-passed transitions, by sorting the plurality of tokens with the input symbols of the previously-passed transitions as a key, wherein
   for each input of the signal or the feature, the signal score is calculated once for each set of tokens.

8. The decoder according to claim 1, wherein the operations further comprise:
   calculating, with respect to each of the plurality of tokens, a hash value for the assigned state and an input symbol of a corresponding previously-passed transition,
   comparing hash values that are calculated, and
   by detecting two or more tokens which have the same hash value, detecting two or more tokens which have the same state assigned thereto and for which respective previously-passed transitions are assigned with the same input symbol.

9. The decoder according to claim 1, wherein the operations further comprise:
   generating a set of tokens including tokens for which respective previously-passed transitions are assigned with the same input symbol,
   determining, for each set of tokens, whether the assigned state is identical, and detecting two or more tokens which have the same state assigned thereto and for which respective previously-passed transitions are assigned with the same input symbol.

10. The decoder according to claim 9, wherein the operations further comprise: for each set of tokens, calculating a signal score based on an input symbol of a corresponding previously-passed transition.

11. The decoder according to claim 1, wherein the operations further comprise:
every time the signal or the feature is input, propagating the tokens until a transition having a non-empty input symbol is passed, and
eliminating duplication of the tokens after the tokens are propagated until a transition having a non-empty input symbol is passed.

12. The decoder according to claim 1, wherein the finite state transducer is a weighted finite state transducer.

13. The decoder according to claim 1, wherein
an input symbol is a score identifier that indicates at least either an algorithm or data for calculating a signal score from the signal or the feature, and
the operations further comprise: with respect to each of the plurality of tokens, calculating a signal score based on the input symbol of a previously-passed transition.

14. The decoder according to claim 1, wherein each of the plurality of tokens holds an output symbol string to which output symbols from a starting state to a reached state in a corresponding path are connected.

15. The decoder according to claim 1 wherein, every time that the plurality of tokens is propagated, eliminates duplication of two or more tokens which have the same state assigned thereto and for which respective previously-passed transitions are assigned with the same input symbol.

16. A decoding method implemented in a computer for searching a path according to a signal sequence that is input or according to a feature sequence of the signal sequence that is input in a finite state transducer, and for outputting an output symbol string on the path, the finite state transducer including at least one state which has two or more incoming transitions and at least one transition assigned with an empity input symbol, the decoding method comprising:
propagating, every time a signal included in the signal sequence or a feature included in the feature sequence is input, each of a plurality of tokens, which is assigned with a state of the head of a path being searched, according to a transition of the finite state transducer; and
eliminating duplication of two or more tokens which have the same state assigned thereto and for which respective previously-passed transitions are assigned with the same input symbol, wherein in propagating each of the plurality of tokens according to transitions of the finite state transducer, changing a state assigned to the token to a next state which is connected to an outgoing transition from the state assigned to the token, if the state assigned to the token has a plurality of outgoing transitions, generating a new token corresponding to each of the plurality of outgoing transitions and, assigning the new token with a next state which is connected to an outgoing transition, and if an outgoing transition from the state assigned to the token is assigned with an empty input symbol, propagating the token until a transition assigned with a non-empty input symbol is passed, and
in eliminating of the duplication of the two or more tokens, every time the token is propagated until a transition assigned with a non-empty input symbol is passed, keeping one token among the two or more tokens and destroying residual tokens.

17. A computer program product comprising a non-transitory computer-readable medium containing a program for searching a path according to a signal sequence that is input or according to a feature sequence of the signal sequence that is input in a finite state transducer, and for outputting an output symbol string on the path, the finite state transducer including at least one state which has two or more incoming transitions and at least one transition assigned with an empty input symbol, the program causing a computer to execute:
propagating, every time a signal included in the signal sequence or a feature included in the feature sequence is input, each of a plurality of tokens, which is assigned with a state of the head of a path being searched, according to a transition of the finite state transducer; and
eliminating duplication of two or more tokens which have the same state assigned thereto and for which respective previously-passed transitions are assigned with the same input symbol, wherein in propagating each of the plurality of tokens according to transitions of the finite state transducer, changing a state assigned to the token to a next state which is connected to an outgoing transition from the state assigned to the token, if the state assigned to the token has a plurality of outgoing transitions, generating a new token corresponding to each of the plurality of outgoing transitions and, assigning the new token with a next state which is connected to an outgoing transition, and if an outgoing transition from the state assigned to the token is assigned with an empty input symbol, propagating the token until a transition assigned with a non-empty input symbol is passed, and
in eliminating of the duplication of the two or more tokens, every time the token is propagated until a transition assigned with a non-empty input symbol is passed, keeping one token among the two or more tokens and destroying residual tokens.

* * * * *